United States Patent [19]
Walser

[11] 3,922,258
[45] Nov. 25, 1975

[54] METHOD OF IMPROVING HEAT STABILITY OF EMULSION POLYMERIZED POLYVINYL CHLORIDE

[75] Inventor: Hans Walser, Westmount, Canada

[73] Assignee: Gulf Oil Canada Limited, Toronto, Canada

[22] Filed: Oct. 29, 1974

[21] Appl. No.: 518,660

[52] U.S. Cl. .................. 260/92.8 W; 260/92.8 A
[51] Int. Cl.² .......................................... C08F 6/14
[58] Field of Search ............... 260/92.8 W, 92.8 A; 450/631.5; 3,652,525/03001972

[56] References Cited
UNITED STATES PATENTS

| 2,199,992 | 5/1940 | Hale | 260/73 |
| 2,365,400 | 12/1944 | Fikentscher | 260/88 |
| 2,438,480 | 3/1948 | Stanton | 260/88 |
| 2,674,593 | 4/1954 | Condo et al. | 260/92.8 |
| 3,183,201 | 5/1965 | Shimeha et al. | 260/31.2 |
| 3,551,396 | 12/1970 | Lanthier | 260/85.7 |
| 3,620,995 | 11/1971 | King | 260/45.85 |
| 3,652,525 | 3/1972 | Nakamura et al. | 260/92.8 W |

FOREIGN PATENTS OR APPLICATIONS

| 581,722 | 8/1959 | Canada | 260/92.8 A |

Primary Examiner—Stanford M. Levin
Attorney, Agent, or Firm—D. R. Morrison

[57] ABSTRACT

An improvement in redox-initiated emulsion polymerization of vinyl chloride comprising post-heating of the product emulsion in the presence of vinyl chloride monomer is disclosed, the post-heating providing under specified conditions improved heat stability of product resin.

4 Claims, 1 Drawing Figure

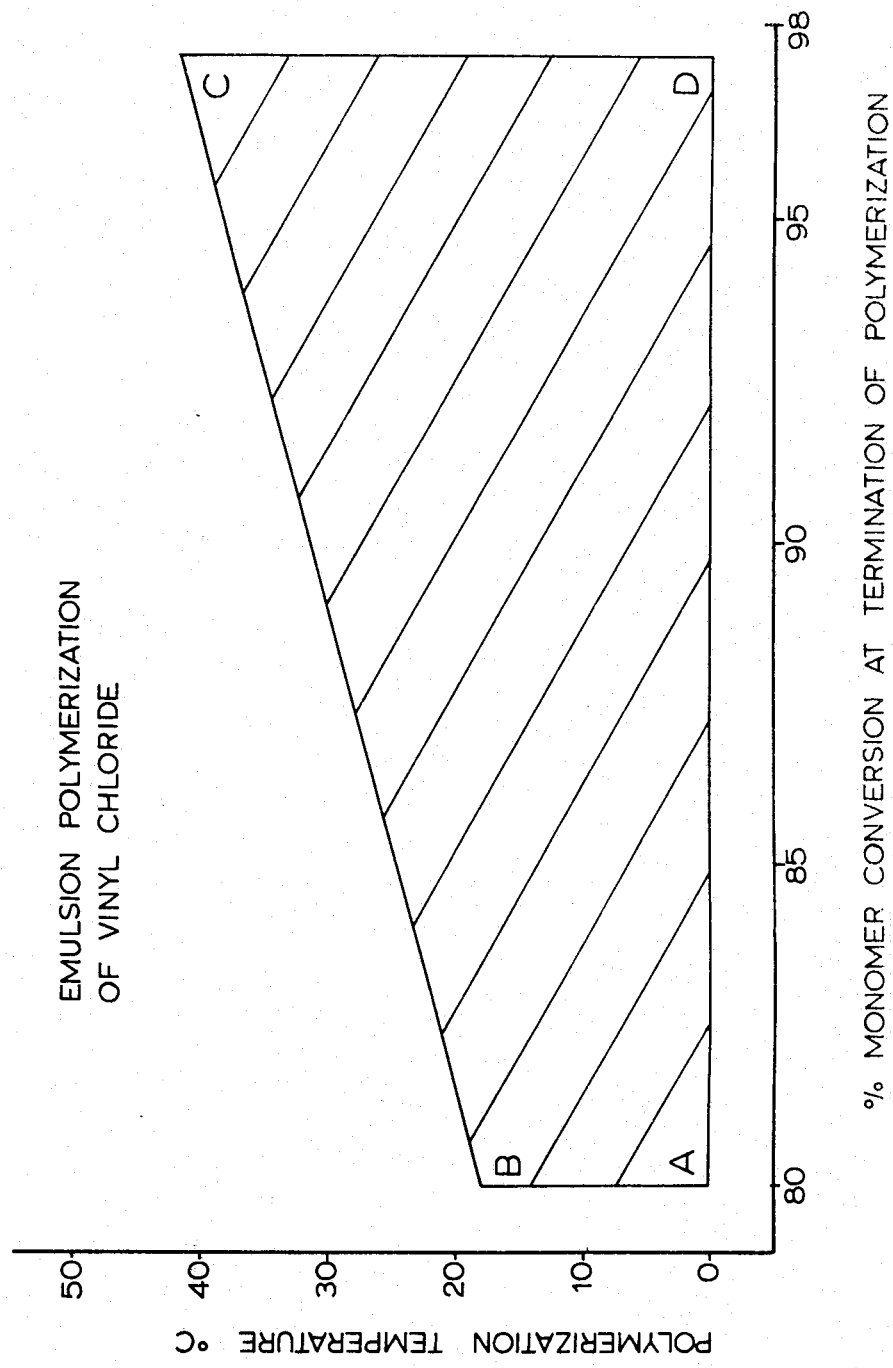

METHOD OF IMPROVING HEAT STABILITY OF EMULSION POLYMERIZED POLYVINYL CHLORIDE

This invention relates to polymerization of vinyl chloride in aqueous medium and more particularly to redox initiated emulsion polymerization of vinyl chloride.

The aqueous emulsion polymerization of vinyl chloride is well-known particularly for the production of vinyl chloride polymer resins suitable for use in plastisols. The characteristics of polyvinyl chloride resins suitable for plastisol use are extremely important and include high molecular weight, small average particle size but with a relatively wide particle size distribution, and thermal stability. In conventional methods of preparing polyvinyl chloride plastisol resins by emulsion polymerization numerous free radical producing initiators are used at polymerization temperatures of the order of 50°C. or higher, examples of such initiators being peroxygen compounds, e.g. inorganic peroxides (hydrogen peroxide, alkali persulfates) and organic peroxides (dibenzoyl peroxide, lauroyl peroxide, t-butyl hydroperoxide), and azo compounds ($\alpha, \alpha'$-azobisisobutyronitrile). Usually the free radical initiated polymerization is carried out in a batch operation using sufficient pressure to maintain emulsified vinyl chloride in the liquid phase at whatever polymerization temperature is being utilized, that is under a pressure substantially equal to its saturated vapor pressure. As the polymerization nears completion a drop in vinyl chloride vapor pressure indicates the disappearance of separate vinyl chloride liquid phase and the reaction is conveniently terminated at this point by venting residual monomer to atomspheric pressure. At a polymerization temperature of about 50°C this drop in vapor pressure occurs when a monomer conversion of about 80–85% has been reached.

Although resins of molecular weight suitable for plastisol use can be obtained in the aforementioned processes, the initiators used therewith are relatively slow acting, quite long reaction times being required to achieve the desired polymerization. By contrast many redox polymerization initiators, which are well-known generally in the polymerization arts, product initiating free radicals extremely rapidly over a wide temperature range and can be used in aqueous emulsion polymerization of vinyl chloride to considerably reduce the reaction times required. For the preparation of plastisol resins however, redox initiators must be used at somewhat lower polymerization temperatures than are used with other initiators, in order to obtain satisfactorily high molecular weight of the product polyvinyl chloride resin. Thus temperatures below about 40°C will generally be required and perhaps even as low as 0°C or lower may be desirable.

In the emulsion polymerization of vinyl chloride many parameters affect the heat stability of the resin product, the question of heat stability being very complex. In work leading to the development of the improvement of the present invention it was found, utilizing electron spin resonance spectroscopy, that under certain conditions poor heat stability of polyvinyl chloride resin is caused by residual free radicals "trapped" in the polymer on termination of the polymerization reaction. This occurs particularly when redox initiators are used, possibly because of the very high rate of free radical production therewith. On heating of product resin, after its separation from the aqueous polymerization medium and drying, the residual free radicals cause increased polymer instability by attack on polymer chains, the increased instability being indicated by early development of yellow color in the heated resin. For example a typical formulation for emulsion polymerization of vinyl chloride, which includes a redox initiator and is used under polymerization conditions of about 50°C and about 80–90% monomer conversion, may be found to give a resin product having satisfactory heat stability but insufficiently high a molecular weight; however, when the polymerization temperature is changed to below about 40°C for the same formulation in order to obtain suitably high molecular weight of product resin (with the monomer conversion at the same time optionally being increased), resin heat stability is adversely affected, apparently as a result of the aforementioned entrapment of free radicals in the polymer chains. When lower polymerization temperatures are used in a batch operation, it is of course more convenient to allow the monomer conversion to reach a higher degree, as separate liquid phase vinyl chloride monomer does not disappear until a higher degree of conversion has been attained. In the continuous process disclosed in U.S. Pat. No. 3,551,396 of R. Lanthier utilizing a loop reactor and redox initiator, high monomer conversion in the emulsion polymerization of vinyl chloride is readily attained at any polymerization temperature because of the inherent nature of the process and interrelated operational factors. Thus in either batch or continuous polymerization processes, poor resin heat stability may be obtained under some polymerization temperature and monomer conversion conditions which are otherwise desirable.

The improvement of the present invention provides a very simple expedient for improving resin heat stability. The invention thus consists of the improvement, in the aqueous emulsion polymerization of vinyl chloride monomer with a free radical producing polymerization initiator under pressure sufficient to maintain emulsified vinyl chloride in the liquid phase at a desired polymerization temperature (a) which is not above 40°C, the polymerization being terminated at a monomer conversion (b) which is not more than 97.5% with subsequent removal of unpolymerized vinyl chloride monomer from product polyvinyl chloride emulsion by venting, where (a) and (b) correspond to the co-ordinates of any point lying within the area substantially delineated by ABCD in the accompanying drawing FIG. 1, said improvement comprising heating the polyvinyl chloride emulsion immediately prior to removal of the unpolymerized monomer therefrom, at a temperature of about 50°–70°C for a period of time sufficient to destroy residual free radicals in the emulsion and thereby increase the heat stability of the polyvinyl chloride.

The figure in the drawing is a graph of the area which defines various conditions of monomer conversion and polymerization temperature below 40°C for which the improvement of the present invention is operable to maintain resin heat stability when the ingredients of a vinyl chloride polymerization formulation and proportions thereof ensure adequate product resin heat stability for resin prepared with the same formulation under reference conditions of 80 to 90% monomer conversion and 50°C. Thus when the conditions of temperature of polymerization and degree of monomer conversion at termination of the polymerization reaction, which are used for preparation of a plastisol resin, correspond to the co-ordinates of any point within the area ABCD of FIG. 1, the method of the present invention, i.e. "post-heating" of emulsion in the presence of monomer, provides improved heat stability in the product resin thereby obtained. The co-ordinates of any point within the area ABCD generally represent the conditions under which "entrapment" of free radicals in polymer occurs. It appears that this entrapment of free radicals in polymer occurs when the temperature of polymerization is lower than the glass transition temperature ($T_G$) of the polymer in the emulsion system at the degree of monomer conversion at which the reaction is terminated. Polyvinyl chloride swells by the action of vinyl chloride monomer thereon, as is well-known, and is swollen by monomer up to a maximum of about 30% monomer by weight. The $T_G$ of the polymer in the presence of monomer in the emulsion polymerization system will therefore vary and will depend primarily on the degree of monomer conversion although it will also be affected by other ingredients of the polymerization formulation. As such $T_G$ values are difficult to calculate or measure with certainty for any specific set of conditions, they are not a satisfactory point of reference in practical terms for the purposes of the present invention.

It is critical that the post-heating of the present invention be carried out in the presence of monomer i.e. before removal of unpolymerized vinyl chloride by venting. If carried out in the absence of monomer, no improvement in resin heat stability is obtained. By post-heating in the presence of monomer it appears that the residual free radicals are destroyed by reaction with the monomer as long as the temperature of the post-heating is higher than the $T_G$ of the polymer in the emulsion polymerization system at the particular conversion. The polymer chains then become sufficiently flexible for accessibility of monomer to reaction with residual free radicals. The destruction of the residual free radicals occurs however only if sufficient monomer is present for the reaction, and the degree of improvement in heat stability obtainable by post-heating thus depends on level of monomer conversion, i.e. amount of monomer left unreacted, at any particular temperature. If the monomer conversion at which the reaction is terminated is 98% or more, the post-heating according to the present invention may not provide improved heat stability. For these reasons, as well as the difficulty in determining $T_G$ values, the conditions of temperature of polymerization and monomer conversion where the improvement of the present invention can be successfully applied are expressed empirically in the drawing. In other words, only for conditions inside the designated area ABCD of FIG. 1 can acceptable heat stability for product resin be obtained with post-heating in accordance with the present invention. It should be noted that points with co-ordinates above the line BC correspond to conditions of polymerization at which satisfactory heat stability of resin can generally be obtained without post-heating.

The information illustrated in the drawing is of course derived from an arbitrary set of conditions. These conditions are that, in the standardized resin heat stability test which will be described in detail in relation to the examples herein, a value of 10 minutes before appearance of yellow coloration in plasticized resin at the test temperature of 188°C is considered the minimum value for satisfactory heat stability. For conditions within area ABCD then, post-heating will provide at least minimally acceptable heat stability for product resin and, depending on the degree of conversion at the particular temperature, often much better heat stability than the chosen minimum value.

The post-heating according to the present invention, for all practical purposes, is suitably carried out at a temperature of about 50° to 70°C, which is well above the $T_G$ value of the polymer in the emulsion system under conditions with which the present invention is concerned. The time required for post-heating is that sufficient to provide the improvement in product resin heat stability i.e. sufficient for reaction of residual free radicals with monomer. Thus a period of about 15–30 minutes is ample, prolonged periods of heating being unnecessary and about 10 minutes being minimal. The post-heating step can readily be carried out prior to venting residual monomer for example by passing the emulsion through a tubular heat exchanger. This particular method is useful regardless of whether batch or continuous techniques of polymerization are involved, as in this manner the need for heating of a large volume of emulsion at one time is obviated. Prior to post-heating of course the polymerization reaction is terminated by means known in the art.

As previously indicated, polymerization temperatures suitable for use with redox initiators for the production of polyvinyl chloride plastisol resins are preferably less than about 40°C and may be as low as 0°C according to the desired molecular weight of the polymer. Of course not all redox initiators are active within this temperature range but these would be known to one skilled in the art of aqueous emulsion polymerization. The monomer conversion at which the reaction is to be terminated at the chosen polymerization temperature is balanced with the use of post-heating to achieve acceptable heat stability of product resin, keeping in mind any effects of conversion level on other properties of the polymer aside from heat stability.

The graph of the drawing was derived from data of experiments utilizing vinyl chloride emulsion polymerization formulations incorporating tert.-butyl hydroperoxide-sodium bisulfite redox with sodium acetate as buffer, and sodium chlorite-sodium bisulfite redox with sodium hydroxide as buffer. Other formulations incorporating redox initiators which have been shown to lead to entrapment of free radicals and consequent adverse effect on resin heat stability under relatively low temperature conditions are manganic ion-sulfinic acid redox with sodium acetate buffer and manganic ion-oxalic acid redox with sodium acetate buffer. All the foregoing are examples of systems with which adverse effects on resin heat stability are observed although the effects are not specific to these systems alone.

Factors other than temperature of polymerization and monomer conversion can also affect thermal stability of emulsion-polymerized polyvinyl chloride resin prepared at any temperature. For instance, the particular buffering agent used and amount thereof may have a considerable effect on heat stability of the product resin. Thus it must be emphasized that the present invention provides means for improving the heat stability of resin primarily when adverse effects with any particular formulation incorporating a redox initiator are caused by the presence of residual free radicals in the polymer chains, as previously discussed herein.

The redox initiators used in the emulsion polymerization according to the present process are used, as in conventional polymerizations, in proportions of about 0.1 to 1% of each component by weight of monomer. The pH at which the polymerization is carried out of course depends on the particular redox initiator being used and is maintained thereat by the use of suitable buffering agents in appropriate proportions to closely control pH during the polymerization. The proportions of monomer to water used are generally such as to provide a total solids content in the product emulsion of about 30 to 60% by weight. Emulsifiers and stabilizers which may be used in the present process are those known in the art of emulsion polymerization of vinyl chloride and are used in proportions of about 0.5 to 4% by weight of monomer. The polymerization can be carried out in batch or continuous processes using delayed additions of at least one of the components of the redox initiator to control the reaction to the desired degree of conversion. As indicated previously herein short-stopping agents may be used if desired to terminate the reaction at the desired conversion.

The examples to follow hereinafter are to be regarded as illustrative of the improvement of the present invention but not as limiting to the scope thereof.

In evaluating the resin heat stability of emulsion-produced polyvinyl chloride and the effect of post-heating thereon the following test was used.

A solution was first prepared of 3 parts by weight Mark BB stabilizer (trademark), a barium-cadmium-zinc phenate type stabilizer sold by Argus Chemical Corp., in 100 parts by weight di(2-ethylhexyl) phthalate plasticizer. In each determination 4 grams of resin (obtained by air drying of emulsion at room temperature) was mixed with sufficient of the foregoing solution to provide 100 parts by weight plasticizer per hundred parts resin. The resulting paste was placed in a vacuum oven (<0.1 mm Hg) at room temperature for 1 hour to deaerate the paste. An oven with 1750 watt heater, forced air flow, and temperature control range 38°–260°C ± 0.5°C was used for the heating of samples. A screen of aluminum plate was placed just inside the oven door, the plate having a relatively small opening therein for inserting and removing samples in order to decrease temperature variation on opening and closing of the oven door. Inside the oven was placed an aluminum tray having 9 parallel slots therein of precise size, 4 mm depth, 24 mm wide. Into each slot could be placed a sample holder consisting of an aluminum block 21 cm × 23 mm × 8 mm containing 10 flat-bottom cylindrical cuts 16 mm in diameter by 4 mm in depth. In each cut could be placed an aluminum dish, formed by a hand press from 0.1 mm aluminum foil, each dish to contain polymer sample. The deaerated paste made from any particular polymer sample was distributed among 9 dishes. Each dish was filled ¾ full with 0.5 ± 0.05 grams of paste and the 9 dishes placed one in each sample holder in corresponding positions. Thus, 10 different pastes could be tested at one time. The sample holders were then placed on the aluminum tray on a special support handle, the whole tray then being placed in the oven, which was preheated to 188°C. After sample loading the oven temperature dropped within the first minute to 185° ± 1°C then rose again to 188° ± 0.5°C within 20 minutes. This temperature pattern was reproducible by virtue of the method of sample loading and use of the same sample holders. Sample holders were successively removed from the oven at chosen intervals of time after loading. The polymer in the dishes was then inspected visually as to coloration, and time of distinct yellowing and time to black coloration of the resin noted. The test temperature of 188°C was chosen as being that used in actual plastisol resin applications and a time of 10 minutes before appearance of yellow coloration in resin under the test conditions taken as the minimum for satisfactory heat stability.

EXAMPLE 1

A. An initial charge of 300 mls water, 1 gram sodium lauryl sulfate, 0.15 grams sodium bisulfite and 0.6 grams sodium acetate was placed in a one-litre polymerization autoclave situated in a water bath maintained at 50°C. The charge was purged with nitrogen for 15 minutes, the autoclave cover (fitted with stirrer consisting of a stainless steel shaft and 3 inch chord-shaped teflon blade) put into place and the charge then purged for 5 minutes with nitrogen through the liquid phase, followed by nitrogen for 1 minute through the gas phase. The autoclave was then pressurized with nitrogen to 55 psig for 10 minutes, the nitrogen vented, and the autoclave evacuated to < 5mm Hg for 15 minutes with an oil pump. The stirrer was started and operated thereafter at 100–125 rpm. 200 grams of liquid vinyl chloride monomer was then introduced into the autoclave from a tared stainless steel cylinder. When the autoclave contents had reached 50°C, a solution (purged with nitrogen for 15 minutes prior to use) containing 0.5 mg of tert.-butyl hydroperoxide per ml. of water was introduced at a rate of 1 ml. per minute until a drop in pressure occurred after 45 minutes, addition of the solution being discontinued at 50 minutes. Unreacted monomer was then vented at 65 minutes after start of the reaction. The monomer conversion was 89.0% by weight and the pH of the product emulsion was 5.2. Polymer was separated from the emulsion by air drying at room temperature. The heat stability test, described previously herein, carried out on the product polymer showed yellowing of the resin at 25 minutes and black coloration at 28 minutes, which indicates very satisfactory resin heat stability for a commercial resin.

B. The procedure of Example 1A was repeated but the polymerization was carried out at 25°C. The additions of tert.-butyl hydroperoxide solution was discontinued 55 minutes after start of the polymerization, a pressure drop having occurred after 40 minutes. Unreacted monomer was vented at 57 minutes after start of the polymerization, the monomer conversion then being 90.2%. The pH of the product emulsion was 5.3. Electron spin resonance (EPR) spectroscopy indicated the presence of free radicals in the product resin. The heat stability determined on a sample of dried product resin showed uellowing of the resin at 5 minutes and black coloration at 28 minutes. The remainder of the emulsion was heated at 50°C for 1 hour (in the absence of unreacted monomer) and dried resin therefrom showed no change in heat stability.

C. The procedure of Example 1 part B was repeated with modification. Addition of tert.-butyl hydroperoxide solution was discontinued at 40 minutes after start of polymerization, pressure drop having occurred after 35 minutes reaction time. Before unreacted monomer was vented off, however, the autoclave was placed in a water bath at 50°–70°C for 15 minutes. Monomer was then vented. The monomer conversion was 89.6% and the pH of the product emulsion was 5.5. Heat stability of product dried resin was found to be 25 minutes to yellow coloration and 31 minutes to black coloration.

EXAMPLE 2

A. The procedure of Example 1 Part A was repeated. The initial charge consisted of 300 mls. water, 0.4 grams sodium bisulfite, 0.23 grams sodium hydroxide, and 1 gram sodium lauryl sulfate. 200 grams vinyl chloride monomer was added. The solution introduced by delayed addition contained 1 mg sodium chlorite per ml water and was added at a rate of 1 ml/min. The polymerization temperature was 50°C. Pressure drop occurred after 40 minutes, the addition of sodium chlorite solution was discontinued at 47 minutes, and unreacted monomer vented at 70 minutes, the monomer conversion then being 92.3%. The pH of the product emulsion was 7.8. Heat stability of dried product resin obtained from the emulsion was 20 minutes to yellow and 35 minutes to black.

B. The procedure of part A was repeated but carried out at a polymerization temperature of 27°C. Addition of sodium chlorite solution was discontinued at 45 minutes, when a pressure drop occurred. Unreacted monomer was vented 10 minutes later, the monomer conversion then being 89.7%. The pH of the product emulsion was 8.2. EPR spectroscopy indicated the presence of free radicals in product resin. Heat stability of dried resin obtained from the emulsion was 5 minutes to yellow and 28 minutes to black. Intrinsic viscosity of the polymer was 1.8 dl/gram (tetrahydrofuran at 25°C).

C. The procedure of part B was repeated with modification. Addition of sodium chlorite solution was discontinued at 52 minutes, pressure drop having occurred after 45 minutes. Before venting unreacted monomer, however, the autoclave was placed in a water bath at 50°–67°C for 15 minutes. Monomer was then vented, the monomer conversion being 93.35. The pH of the product emulsion was 7.6. Heat stability of dried product polymer obtained from emulsion was 20 minutes to yellow and 25 minutes to black. Intrinsic viscosity of the polymer was 1.82 dl/gram (tetrahydrofuran, 25°C).

EXAMPLE 3

This example illustrates the effects of post-heating of emulsion in the presence of monomer at different monomer conversions using a polymerization temperature of 8°C and the formulation of Example 1. The procedure was as generally described in previous examples. In each case the initial charge consisted of 300 ml water, 1 gram sodium lauryl sulfate, 0.15 grams sodium bisulfite and 0.6 grams sodium acetate. 200 grams of vinyl chloride monomer was added. A solution containing 0.5 mg tert.-butyl hydroperoxide per ml water was introduced by delayed addition at a rate of 1 ml per minute. When post-heating was employed, 5 minutes after discontinuing addition of tert.-butyl hydroperoxide solution the emulsion was heated with mild agitation for 15 minutes in a 70°C water bath. Unreacted monomer was then vented. Where post-heating was not employed, addition of tert.-butyl hydroperoxide solution was extended for an extra 5 minutes before venting monomer. The results are shown in Table 1.

TABLE 1

| | (Polymerization Temperature 8°C) | | |
|---|---|---|---|
| | Post-Heating | Resin Heat Stability: | |
| % Monomer Conversion | of Emulsion (70°C) | to Yellow (mins) | to Black (mins) |
| 95.1 | No | 3 | 7 |
| 97.9 | Yes | 5 | 10 |
| 89.1 | No | 5 | 10 |
| 91.3 | Yes | 18 | 25 |
| 83.5 | No | 5 | 15 |
| 80.8 | Yes | 20 | 25 |

It will be noted that at 97.9% monomer conversion post-heating of emulsion does not give satisfactory resin heat stability and a point having as co-ordinates 8°C polymerization temperature and 97.9% monomer conversion does not lie within the area ABCD of the drawing. Other values of monomer conversion at 8°C shown in Table 1 do lie within area ABCD of the drawing and post-heating gives satisfactory resin heat stability under such conditions.

Numerous other modifications of the various expedients described can be made without departing from the scope of the invention which is defined in the following claims.

What is claimed is:

1. In the aqueous emulsion homopolymerization of vinyl chloride monomer with a free radical producing redox polymerization initiator under pressure sufficient to maintain emulsified vinyl chloride in the liquid phase at a desired polymerization temperature (a) which is not above 40°C, the polymerization being terminated at a monomer conversion (b) which is not more than 97.5% with subsequent removal of umpolymerized vinyl chloride monomer from product polyvinyl chloride emulsion by venting, where (a) and (b) correspond to the co-ordinates of any point lying within the area substantially delineated by ABCD in the accompanying drawing, the improvement comprising heating the polyvinyl chloride emulsion immediately prior to removal of the unpolymerized monomer therefrom, at a temperature of about 50°–70°C for a period of time of at least 10 minutes and sufficient to destroy residual free radicals in the emulsion and thereby increase the heat stability of the polyvinyl chloride to a value of at least 10 minutes before appearance of yellow coloring of the polyvinyl chloride when plasticized with an equal weight of di(2-ethylhexyl) phthalate plasticizer containing 3% by weight of barium-cadmium-zinc phenate type stabilizer and heated to 188°C.

2. The improvement in a process as claimed in claim 1 wherein the time of heating of product polymer emulsion is about 15–30 minutes.

3. The improvement in a process as claimed in claim 1 wherein the polymerization initiator is a redox polymerization initiator comprising tert.-butyl hydroperoxide and sodium bisulfite.

4. The improvement in a process as claimed in claim 1 wherein the polymerization initiator is a redox polymerization initiator comprising sodium chlorite and sodium bisulfite.

* * * * *